Patented Feb. 7, 1939

2,146,477

UNITED STATES PATENT OFFICE

2,146,477

PROCESS FOR THE PREPARATION OF DERIVATIVES OF β-(p-HYDROXYPHENYL)-ISOPROPYLAMINE

Gustav Hildebrandt, Mannheim, Germany, assignor to E. Bilhuber Inc., Jersey City, N. J.

No Drawing. Application December 23, 1937, Serial No. 181,459. In Germany December 31, 1936

1 Claim. (Cl. 260—574)

This invention relates to the preparation of derivatives of β-(p-hydroxyphenyl)-isopropylamine of the general formula

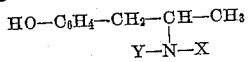

In this formula X designates hydrogen, an alkyl radical, for example methyl, ethyl, propyl, isopropyl, butyl, isobutyl, isoamyl, etc., or a cycloalkyl radical, for example cyclohexyl o-, m- or p-methyl-cyclohexyl, tetrahydronaphthyl, decahydronaphthyl, etc., and Y an alkyl radical containing at least two carbon atoms, for example ethyl, propyl, isopropyl, butyl, isobutyl, isoamyl, etc., or a cycloalkyl radical such as cyclohexyl.

It has already been proposed to prepare β-(p-methoxyphenyl)-isoproplmethylamine by condensing β-(p-methoxyphenyl)-isopropylamine with benzaldehyde to form the corresponding Schiff's base, treating the Schiff's base with methyl iodide or a similar compound and hydrolysing the resulting addition product with aqueous acid. The resulting β-(p-methoxyphenyl)-isopropylmethylamine may be converted by demethylation into β-(p-hydroxyphenyl)-isopropylmethylamine, which according to known data is physiologically active and is said to exert actions similar to those of ephedrine. According to the process of U. S. A. patent application Serial No. 144,545 the β-(p-hydroxyphenyl)-isopropylamine is treated with methylating agents.

According to this invention it has been found that the favourable therapeutic properties of β-(p-hydroxyphenyl)-isopropylmethylamine are not limited to these substances alone but that substances of the like favourable therapeutic properties are obtained if β-(p-hydroxyphenyl)-isopropylamine is treated with alkylating or cycloalkylating agents. In this way products are obtained of the general formula

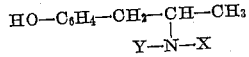

in which X is hydrogen, an alkyl radical or a cycloalkyl radical and Y is an alkyl radical containing at least two carbon atoms or a cycloalkyl radical. In the production of these products the alkylating or cycloalkylating agents are so selected that they yield either X or Y or X and Y.

The process of this invention may be carried into effect by treating the β-(p-hydroxyphenyl)-isopropylamine with known alkylating or cycloalkylating agents. Thus for example the initial base may be heated with diethyl sulphate. Another known alkylating method consists in heating the initial base with alkyl halides, for example butyl, isobutyl or isoamyl halides, for example bromides or iodides. Finally the alkylation may be effected by condensing the base with aldehydes or ketones and simultaneously effecting reduction, for example by condensing β-(p-hydroxyphenyl)-isopropylamine with acetone and simultaneously reducing, whereby β-(p-hydroxyphenyl)-isopropyl-isopropylamine is obtained.

In like manner in order to prepare cycloalkyl derivatives β-(p-hydroxyphenyl)-isopropylamine may be treated with known cycloalkylating agents, for example by condensing with cycloaldehydes or ketones and simultaneously reducing.

Example 15.1 gms. of β-(p-hydroxyphenyl)-isopropylamine are heated on the water bath with 14 gms. of benzaldehyde. After removing the water resulting from the condensation 18 gms. of diethyl sulphate are added and the whole is heated for a short time to 160–170° C. The reaction product is then treated with dilute hydrochloric acid and extracted with ether and the resulting β-(p-hydroxyphenyl)-isopropylethylamine is precipitated with potassium carbonate solution. The sulphate of the base crystallizes from alcohol and decomposes at 310° C.

What I claim is:

A process for the preparation of derivatives of β-(p-hydroxyphenyl)-isopropylamine of the formula

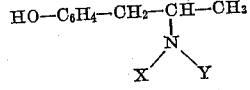

in which X is a radical selected from the group consisting of hydrogen, lower alkyl, and cycloalkyl radicals and in which Y is a radical selected from the group consisting of lower alkyl radicals having at least two carbon atoms and cycloalkyl radicals, which consists in contacting β-(p-hydroxyphenyl)-isopropylamine with agents selected from the group consisting of lower alkylating and cycloalkylating agents.

GUSTAV HILDEBRANDT.